United States Patent
Dubay et al.

(10) Patent No.: US 9,969,345 B2
(45) Date of Patent: May 15, 2018

(54) ENERGY ABSORBING STRAP RETAINING DEVICE

(71) Applicant: Steering Solutions IP Holding Corporation, Saginaw, MI (US)

(72) Inventors: Robert W. Dubay, Saginaw, MI (US); Michael P. Anspaugh, Bay City, MI (US); Melvin L. Tinnin, Clio, MI (US); Roger A. Bourbina, Saginaw, MI (US); Donald A. Buzzard, Saginaw, MI (US)

(73) Assignee: STEERING SOLUTIONS IP HOLDING CORPORATION, Saginaw, MI (US)

( * ) Notice: Subject to any disclaimer, the term of this patent is extended or adjusted under 35 U.S.C. 154(b) by 0 days. days.

(21) Appl. No.: 14/934,844

(22) Filed: Nov. 6, 2015

(65) Prior Publication Data

US 2016/0244015 A1    Aug. 25, 2016

Related U.S. Application Data

(60) Provisional application No. 62/120,516, filed on Feb. 25, 2015.

(51) Int. Cl.
*F16F 7/12* (2006.01)
*B62D 1/19* (2006.01)
*B60R 21/02* (2006.01)

(52) U.S. Cl.
CPC .............. *B60R 21/02* (2013.01); *B62D 1/195* (2013.01); *F16F 7/123* (2013.01); *F16F 7/128* (2013.01); *B60R 2021/0233* (2013.01); *B62D 1/192* (2013.01)

(58) Field of Classification Search
USPC .......................................... 280/777; 188/371
See application file for complete search history.

(56) References Cited

U.S. PATENT DOCUMENTS

| 7,455,320 | B2 * | 11/2008 | Imamura | ................ B62D 1/195 |
| | | | | 280/777 |
| 2004/0004348 | A1 * | 1/2004 | Manwaring | ............. F16F 7/123 |
| | | | | 280/777 |
| 2006/0273568 | A1 * | 12/2006 | Manwaring | ............ B62D 1/195 |
| | | | | 280/777 |
| 2007/0013180 | A1 * | 1/2007 | Stuedemann | .......... B62D 1/195 |
| | | | | 280/775 |

\* cited by examiner

*Primary Examiner* — Keith J Frisby
(74) *Attorney, Agent, or Firm* — Cantor Colburn LLP

(57) ABSTRACT

An energy absorbing system includes a subject structure, an energy absorbing strap associated with the subject structure, and a retaining device to selectively retain the energy absorbing strap during an energy addition event. The retaining device surrounds both an upper and lower portion of the energy absorbing strap.

12 Claims, 3 Drawing Sheets

ENERGY ABSORBING STRAP RETAINING DEVICE

CROSS REFERENCE TO RELATED APPLICATIONS

This patent application claims priority to U.S. Provisional Patent Application Ser. No. 62/120,516, filed Feb. 25, 2015, which is incorporated herein by reference in its entirety.

BACKGROUND OF THE INVENTION

The present invention relates generally to energy absorbing systems and more particularly to an energy absorbing system that includes a retaining device to selectively retain an energy absorbing strap during an energy addition event.

In today's world, vehicles commonly include a steering column assembly positioned in front of a vehicle operator. In some situations, the operator and others in the vehicle (i.e., occupants) may contact the steering column assembly, whereby kinetic energy of the occupants may be dissipated through compression of the steering column assembly. In certain applications, energy absorbing straps are associated with the steering column and the vehicle structure to absorb energy in a controlled manner.

Accordingly, it is desirable to have systems and methods for controlling the dissipation of kinetic energy of vehicle occupants in the event of contact between a vehicle occupant and a steering column assembly.

SUMMARY OF THE INVENTION

An energy absorbing system includes a subject structure, an energy absorbing strap associated with the subject structure, and a retaining device to selectively retain the energy absorbing strap during an energy addition event. The retaining device surrounds both an upper and lower portion of the energy absorbing strap.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Figure 1:
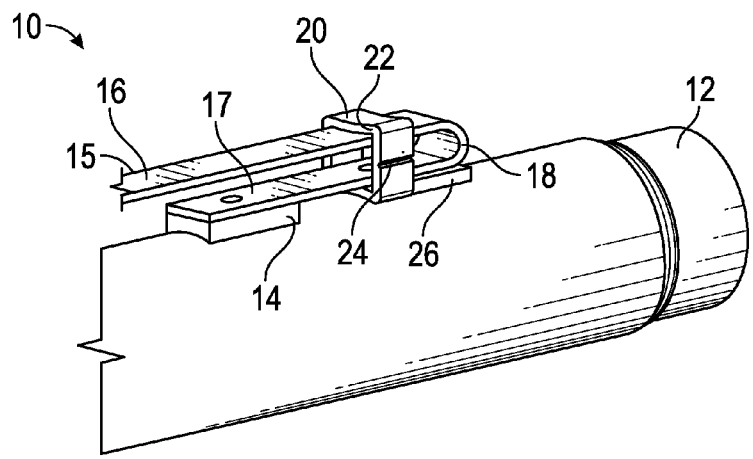
FIG. 1 shows a perspective view of an exemplary energy absorbing system configured to retain the energy absorbing strap during an energy addition event, such as a vehicle collision.
Figure 2:
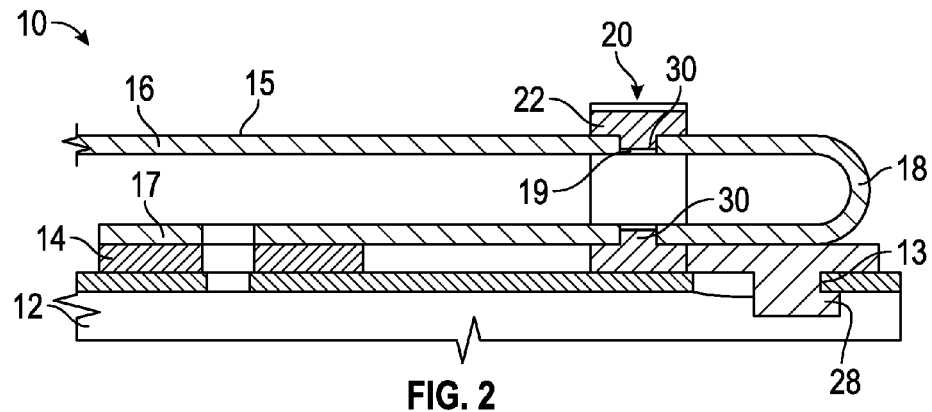
FIG. 2 shows a cross sectional view of the energy absorbing system of FIG. 1.
Figure 3:
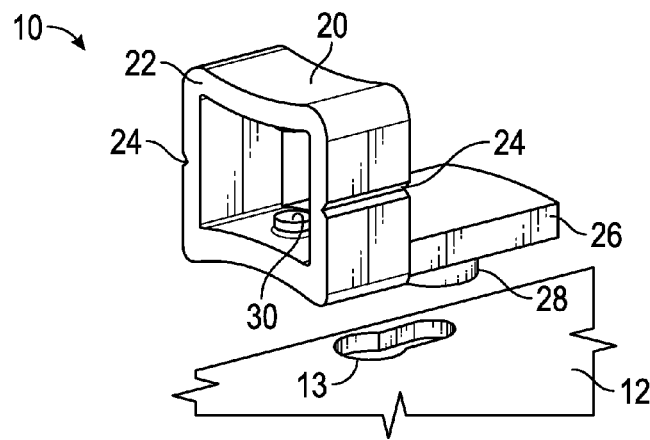
FIG. 3 shows a perspective view of the retaining device of the energy absorbing system of FIG. 1.

Referring now to the Figures, where the invention will be described with reference to specific embodiments, without limiting same, FIGS. 1-3 show an exemplary energy absorbing system 10. In an exemplary embodiment, energy absorbing system 10 includes a subject structure, such as upper jacket 12, an energy absorbing strap 15, and an energy absorbing strap retaining device 20.

In an exemplary embodiment upper jacket 12 is associated with a steering system of a vehicle. During certain collisions, occupants may contact the steering column of the vehicle and impart kinetic energy to the steering system. In order to minimize injuries, the steering system may include an energy absorbing mechanism to absorb the kinetic energy imparted during the impact. In certain embodiments, the upper jacket 12 is the subject structure of the steering system to have an energy absorbing mechanism. In an exemplary embodiment, upper jacket 12 is attached to an energy absorbing strap 15. In an exemplary embodiment, the upper jacket 12 includes a strap mounting pad 14 to allow for an attachment point of the energy absorbing strap 15.

In an exemplary embodiment, energy absorbing strap 15 includes an outer portion 16, an inner portion 17, and a bend radius 18 disposed there between. In an exemplary embodiment, the inner portion 17 is attached to the upper jacket 12. In certain embodiments, inner portion 17 is attached to a strap mounting pad 14. Outer portion 16 is affixed to a portion of a vehicle that will remain stationary relative to the upper jacket 12. In an exemplary embodiment, the energy absorbing strap 15 is manufactured with a bend radius 18 to allow for desirable packaging and energy absorbing characteristics. In certain embodiments, energy absorbing strap 15 includes interface holes 19 to attach to protrusions of other components as will be described hereinafter. In an exemplary embodiment, energy absorbing strap 15 allows for energy to be absorbed via movement, bending, and deformation of the strap 15 during an energy addition event such as a collision. In an exemplary embodiment, the initial and continued behavior of the energy absorbing strap 15 can be controlled or influenced by a strap retaining device 20.

In an exemplary embodiment, a retaining device 20 is associated with the energy absorbing strap 15 to control the movement and energy absorption properties of the energy absorbing strap. Advantageously, retaining device 20 can control and adjust the initial energy absorbing characteristics of the energy absorbing system 10, as well as the continued energy absorbing properties of the energy absorbing system 10. In an exemplary embodiment, the retaining device 20 can retain the energy absorbing strap 15 near the bend radius 18. In certain embodiments, the retaining device 20 can be configured to constrain the energy absorbing strap 15 by preventing off-axis movement. In certain embodiments, the retaining device 20 can retain a relative geometry or relationship between the outer portion 16, inner portion 17, and/or bend radius 18. In an exemplary embodiment, the retaining device 20 includes a tuned cross section 22 selected to control the energy absorbing characteristics of the energy absorbing strap 15. The tuned cross section 22 can be configured to release after a predetermined energy has been imposed upon it, as will be described hereinafter. Advantageously, by utilizing a tuned cross section 22 an initial energy absorbing characteristic of the energy absorbing strap 15 can be selected while providing a secondary energy absorbing characteristic of the energy absorbing strap 15 after the retaining device releases.

In an exemplary embodiment, the retaining device 20 includes a break away portion 24. The breakaway portion 24 may be a portion with reduced material, different material, or a stress concentration, etc. The breakaway portion 24 is configured to release the retaining device 20 at or above a predetermined energy level or load level to allow configuration of the energy absorbing characteristics of the energy absorbing strap 15. In certain embodiments, the retaining device 20 can be formed of a preselected material to adjust the release characteristics of the retaining device 20. In certain embodiments, the retaining device 20 can include notches, radiuses, etc. to adjust the release characteristics of the retaining device 20.

In certain embodiments, retaining device 20 includes an anti-dive portion 26. Anti-dive portion 26 may be an extended portion disposed adjacent to the bend radius 18 of the energy absorbing strap. Advantageously, anti-dive portion 26 may prevent diving of the energy absorbing strap 15 during a collision or other energy addition event, to allow for more predictable response during an energy addition event. In alternative embodiments, anti-dive portion 26 can be configured to prevent lift of energy absorbing strap 15.

In an exemplary embodiment, retaining device 20 can include protrusions 30 to interface with the energy absorbing strap 15 via interface holes 19. In an exemplary embodiment, the protrusions 30 can be configured to release from the interface holes 19 after a predetermined energy is exceeded. In certain embodiments, the interface holes 19 include a cam or ramped portion to release the protrusions 30 from interface holes 19.

Referring to FIG. 3, in certain embodiments, the retaining device 20 includes a keyed protrusion 28. The keyed protrusion 28 may interface with a keyhole slot 13 of the upper jacket 12. Advantageously, the keyed protrusion 28 may facilitate ease of installation of the retaining device 20 and may further allow configuration of the release characteristics of the retaining device 20. In certain embodiments, the keyed protrusion 28 can be configured to release or break away after a predetermined energy input.

Figure 4:
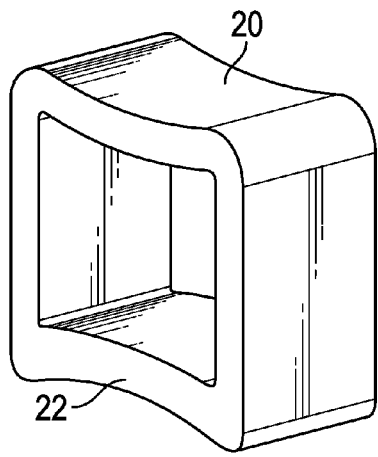
FIG. 4 shows an alternative embodiment of a retaining device for use with the energy absorbing system of FIG. 1.

FIG. 4 shows an alternative embodiment of the retaining device 20. In an alternative embodiment, the retaining device 20 utilizes a cross section 22 to control the energy absorbing characteristics of the energy absorbing strap 15. Advantageously, such alternative embodiments may provide weight and cost savings while providing desirable energy absorbing characteristics.

Figure 5:
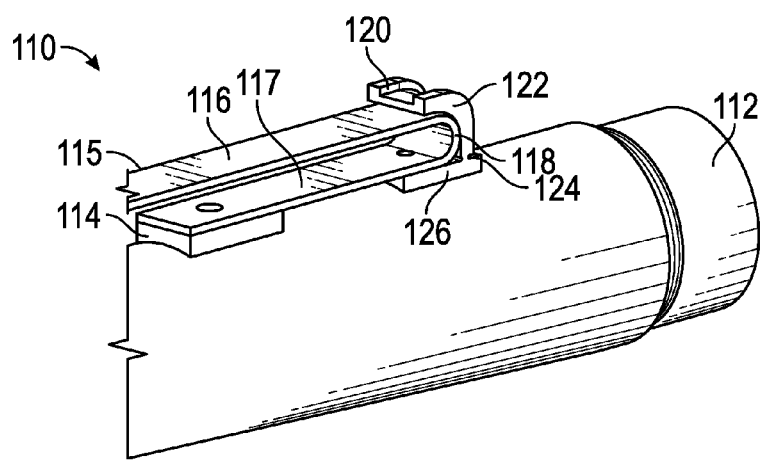
FIG. 5 shows a perspective view of an exemplary energy absorbing system configured to retain the energy absorbing strap during an energy addition event, such as a vehicle collision.
Figure 6:
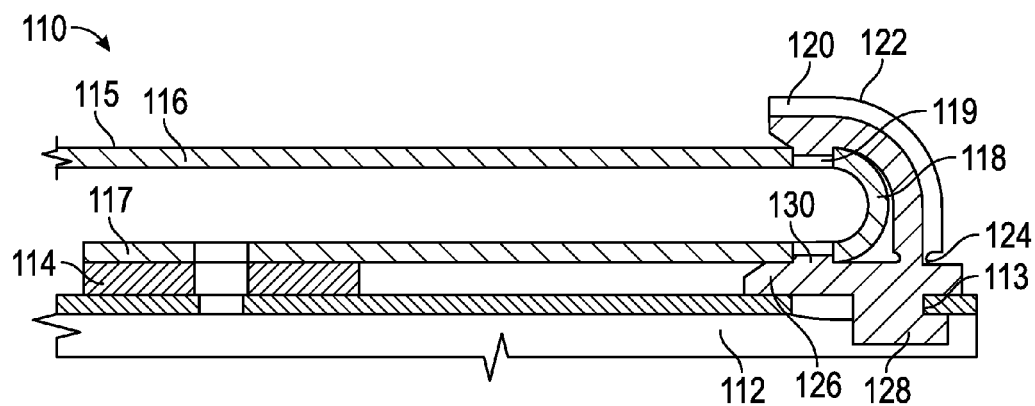
FIG. 6 shows a cross sectional view of the energy absorbing system of FIG. 5.
Figure 7:
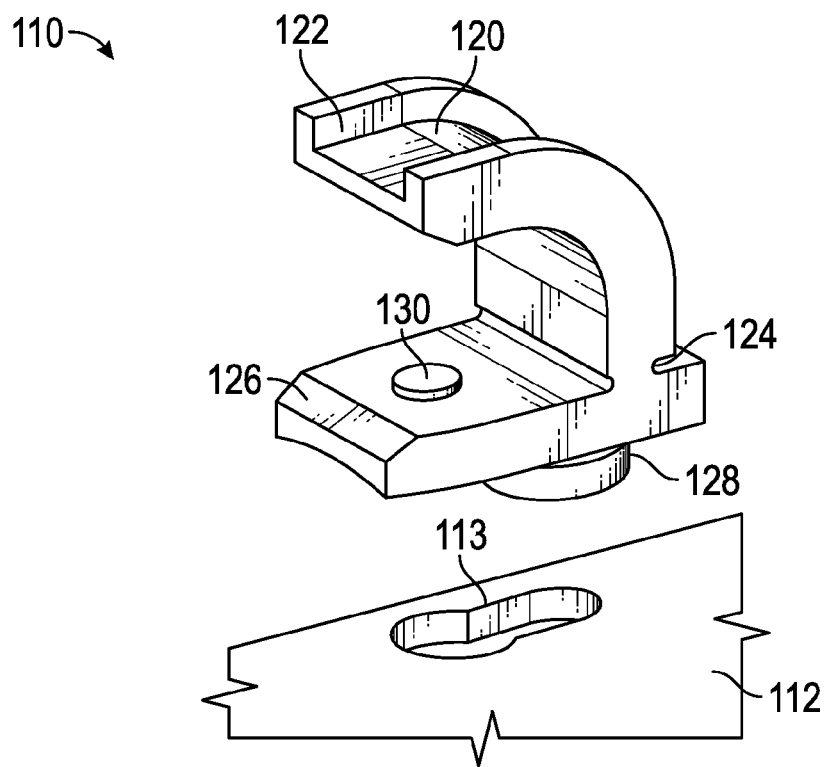
FIG. 7 shows a perspective view of the retaining device of the energy absorbing system of FIG. 5.

In FIGS. 5-8, elements shown with similar reference numbers refer to similar previously described elements. For example, the upper jacket 12 shown in FIG. 1 is similarly shown as upper jacket 112 in FIG. 5. Referring to FIGS. 5-7, an alternative energy absorbing system 110 is shown. In an exemplary embodiment, the retaining device 120 is associated with the bend radius 118 of the energy absorbing strap 115. In certain embodiments, the retaining device 120 is in contact with and can move with the energy absorbing strap 115 and the bend radius 118. Advantageously, the bend radius 118 can be maintained by the retaining device 120.

In an alternative embodiment, the retaining device 120 can include a break away portion 124 near the bend radius 118. Advantageously, the retaining device 120 can provide an initial energy absorbing characteristic and a secondary energy absorbing characteristic after the retaining device 120 breaks away at the break away portion 124. In an exemplary embodiment, the breakaway portion 124 can be configured to break away after a predetermined energy input.

Figure 8:
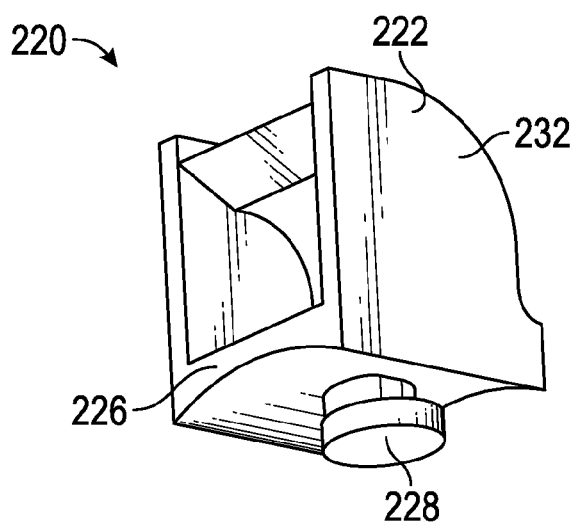
FIG. 8 shows an alternative embodiment of a retaining device for use with the energy absorbing system of FIG. 5.

Referring to FIG. 8, in an alternative embodiment, the retaining device 220 includes lateral retaining walls 232. Lateral retaining walls 232 can retain a bend radius 118 of the energy absorbing strap 115 as well as control dive of the energy absorbing strap 115.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, it is claimed:

1. An energy absorbing system, the system comprising:
  a strap mounting pad disposed on a subject structure;
  an energy absorbing strap having an outer portion and an inner portion, the inner portion attached to the strap mounting pad; and
  a retaining device to selectively retain the energy absorbing strap during an energy addition event and constrain a geometric relationship between the outer and inner portions of the energy absorbing strap, the retaining device includes a first protrusion that extends into an interface hole of the inner portion to attach the energy absorbing strap to the retaining device and a break away portion to break away at a predetermined break away load level during the energy addition event and release the geometric relationship between the outer and inner portions of the energy absorbing strap.

2. The energy absorbing system of claim 1 wherein the retaining device releases the energy absorbing strap after exceeding a predetermined release load level during the energy addition event.

3. The energy absorbing system of claim 1, wherein the retaining device is associated with a bend radius of the energy absorbing strap.

4. The energy absorbing system of claim 3, wherein the retaining device is in contact with the bend radius of the energy absorbing strap during the energy addition event.

5. The energy absorbing system of claim 3, wherein the retaining device maintains the bend radius during the energy addition event.

6. The energy absorbing system of claim 1, the retaining device including at least one lateral retaining portion.

7. The energy absorbing system of claim 1, the retaining device including a tuned cross section.

8. The energy absorbing system of claim 1, the retaining device including a second protrusion that is disposed opposite the first protrusion to retain the energy absorbing strap.

9. The energy absorbing system of claim 1, wherein the retaining device is keyed to the subject structure.

10. The energy absorbing system of claim 9, wherein the retaining device releases from the subject structure after exceeding a predetermined retaining device release load level during the energy addition event.

11. The energy absorbing system of claim 1, wherein the retaining device includes an anti-dive portion having a keyed protrusion that extends into a keyhole slot that is defined by the subject structure.

12. The energy absorbing system of claim 11, wherein the anti-dive portion prevents diving of the energy absorbing strap during the energy addition event.

\* \* \* \* \*